3,031,458
ISOINDOLINES
Charles Ferdinand Huebner, Chatham, N.J., assignor to Ciba Pharmaceutical Products, Inc., Summit, N.J., a corporation of New Jersey
No Drawing. Filed Feb. 5, 1958, Ser. No. 713,308
12 Claims. (Cl. 260—319)

This invention concerns isoindoline derivatives. The new isoindolines contain in the 1-position an aromatic radical and in the 2-position a hydrocarbon radical substituted by an amino group. More particularly, it relates to 1-R-2-tertiary amino-alkyl-isoindolines, in which R represents an aryl or an aralkyl radical, the salts and quaternary ammonium compounds and process for the preparation of such compounds.

The substituent R in the 1-position of the isoindoline molecule, representing an aryl or an aralkyl radical, stands more especially for a monocyclic or a bicyclic aryl or aralkyl radical, such as a phenyl radical; a phenyl-lower alkyl radical, e.g. a benzyl, a phenylethyl or a phenylpropyl radical; or a naphthyl-lower alkyl radical, e.g. a 1-naphthyl-methyl or a 2-naphthyl-methyl radical. The alkyl radical of the aralkyl radicals is preferably a lower alkylene radical having from 1 to 3 carbon atoms and may be represented by a 1,2-ethylene, a 1,3-propylene or especially by a methylene radical. Such radicals may also contain lower alkyl groups, e.g. methyl or ethyl, as additional substituents; thus such radicals may be represented by 1,1-ethylene, 1,2- or 2,2-propylene. The aromatic radical of a substituent R may be unsubstituted or contain at least one substituent such as, for example, a lower alkyl group, e.g. methyl or ethyl; a halogen atom, e.g. chlorine or bromine; hydroxyl; a lower alkoxy group, e.g. methoxy, ethoxy or methylene-dioxy; or an amino group, e.g. amino or dimethylamino.

The tertiary aminoalkyl radical in the 2-position of the isoindolines is more especially a tertiary amino-lower alkyl group, the lower alkyl radical of which contains from 2 to 7 carbon atoms and can be represented by a lower alkylene radical, which may also be branched, such as, for example, 1,2-ethylene, 1,3-propylene, 1,2-propylene, 1,4-butylene, 1,3-butylene, 1,2-butylene, 2,3-butylene, 1,2-isobutylene, 1,5-pentylene or 1,4-pentylene. The lower alkylene radical or part of it may also be incorporated into a saturated heterocyclic ring system containing the tertiary amino group. The nitrogen atoms of the isoindoline ring and the tertiary amino group are preferably separated by at least two carbon atoms. Tertiary amino groups are particularly N,N-di-lower hydrocarbon-amino or N,N-lower alkylene-imino groups. Lower hydrocarbon radicals of an N,N-di-lower hydrocarbon-amino group are, for example, lower alkyl, lower alkenyl, lower cycloalkyl, aryl or aralkyl radicals containing from 1 to 7 carbon atoms, e.g. methyl, ethyl, propyl, isopropyl, butyl, isobutyl, pentyl, neopentyl, allyl, methylallyl, cyclopentyl, cyclohexyl, phenyl or benzyl. Therefore, such N,N-di-lower hydrocarbon-amino groups are, for example, dimethylamino, diethylamino, dipropylamino, N-methyl-N-cyclopentylamino or N-methyl-N-benzylamino groups. The lower alkylene radicals of an N,N-lower alkylene-imino group contain from 4 to 6 carbon atoms which may be arranged in a carbon chain or such carbon chain may be interrupted by a hetero atom such as nitrogen, sulfur or oxygen and form an aza-, thia- or oxaalkylene radical; together with the nitrogen such alkylene radicals represent, for example, a pyrrolidino radical, e.g. pyrrolidino or 2-methyl-pyrrolidino; a piperidino radical, e.g. piperidino, 2-methyl-piperidino, 3-methyl-piperidino, 4-methyl-piperidino, 3-hydroxy-piperidino, 3-acetoxy-piperidino or 3-hypdroxymethyl-piperidino; hexamethylene-imino, morpholino, thiamorpholino or a piperazino radical, e.g. 4-methyl-, 4-hydroxyethyl- or 4-acetoxyethyl-piperazino. The tertiary amino-lower alkyl radical may also be represented by a saturated heterocyclic radical, in which one of the carbon atoms of the heterocyclic ring is connected directly or through a lower alkylene radical, e.g. methylene or 1,2-ethylene, with the nitrogen atom of the isoindoline ring, for example, a 1-methyl-piperidino-(3)-methyl or a 1-methyl-piperidino-(4)-radical.

The aromatic portion of the isoindoline nucleus may be unsubstituted or may contain at least one substituent in any of the four positions available for substitution. Such substituents are more especially halogen atoms, e.g. chlorine or bromine; hydroxyl; lower alkoxy radicals, e.g. methoxy or ethoxy; lower alkyl radicals, e.g. methyl or ethyl; or amino groups, e.g. amino or dimethylamino.

Salts of the compounds of this invention are particularly therapeutically useful acid addition salts with inorganic acids, such as hydrohalic acids, e.g. hydrochloric or hydrobromic acid; nitric or thiocyanic acid, sulfuric or phosphoric acids; or organic acids, such as acetic, propionic, glycolic, lactic, pyruvic, oxalic, malonic, succinic, maleic, fumaric, malic, tartaric, citric, benzoic, cinnamic, mandelic, salicyclic, 4-amino-salicylic, 2-phenoxy-benzoic or 2-acetoxy-benzoic, methane sulfonic, ethane sulfonic, hydroxyethane sulfonic, benzene or toluene sulfonic acid or amino acids, e.g. methionine, tryptophane, lysine or arginine. Mono-, bis- or tris-salts may be formed according to the procedure used for the preparation and the number of salt forming groups present in a molecule.

Quaternary ammonium compounds of the 1-R-2-tertiary aminoalkyl-isoindolines of this invention may be either mono-, bis- or tris-quaternary ammonium compounds depending on the conditions used and the number of tertiary amino groups present in the molecule. Quaternary ammonium compounds are particularly lower alkohalides, e.g. methiodides, methobromides, methochlorides, ethiodides or ethochlorides; lower alkyl sulfates, e.g. dimethyl or diethyl sulfates; lower alkyl aryl sulfonates, e.g. methyl p-toluene sulfonates; or the corresponding hydroxides thereof, or salts of such hydroxides with organic or inorganic acids.

Due to the presence of at least one asymmetric carbon atom, the 1-R-2-tertiary amino-alkyl-isoindolines, their salts and quaternary ammonium compounds may exist in the form of the racemic d, l-mixture or as the optically active d- and l-forms obtainable from the racemic mixture.

The new compounds of this invention show interesting pharmacological activities and are intended to be used as medicaments. Thus, animal tests with the 1-R-2-tertiary aminoalkyl-isoindolines of this invention, wherein R has the above-given meaning, and the salts thereof, show quieting as well as antihistaminic effects. In addition, the new compounds have anti-inflammatory properties, inasmuch as they are able to reduce experimentally produced edema. They may therefore be used as antihistaminic agents in the treatment fo allergic disorders, as tranquilizing agents in states of nervousness, anxiety, stress and shock, or as anti-inflammatory agents in cases of acute tonsillitis and bronchitis, especially to combat the symptomatic conditions, such as edema. Most valuable are the 1-R-2-(N,N-di-lower alkylamino-lower alkyl)-isoindolines, in which the aromatic portion of the isoindoline nucleus is unsubstituted or substituted by 1 to 4 chlorine atoms, and in which R represents a benzyl or a naphthyl-(2)-methyl radical, which may be unsubstituted or may contain in the aromatic portion as substituents those mentioned before, and the therapeutically useful acid addition salts thereof. Representing this group are, for example, the 1-benzyl-2-(2-dimethylaminoethyl)-isoindoline of the formula:

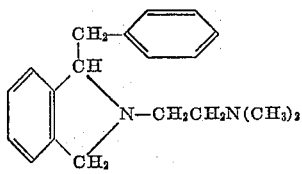

and the 1-[naphthyl-(2)-methyl]-2-(2-dimethylaminoethyl)-isoindoline of the formula:

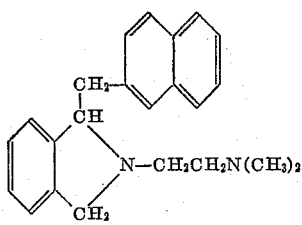

and the addition salts with hydrohalic acids, such as the dihydrochloride.

The mono-, bis- and tris-quaternary ammonium compounds of the isoindolines of this invention exhibit a hypotensive effect in animals, for example, in trained hypertensive dogs. Such quaternary ammonium compounds may therefore be used in the treatment of hypertensive conditions. Most valuable with respect to this activity are the mono-, bis- or tris-lower alkohalides, e.g. methiodides or methochlorides of 1-R-2-(N,N-di-lower alkylamino-lower alkyl)-isoindolines and the 1-R-2-(N,N-lower alkylene-imino-lower alkyl)-isoindolines, in which the aromatic portion of the isoindoline ring is unsubstituted or substituted by 1 to 4 halogen, e.g. chlorine, atoms, and in which R represents a benzyl radical which may be unsubstituted or substituted by one of the substituents outlined thereinbefore. Representing this group is the bis-quaternary isoindolinium salt of the formula:

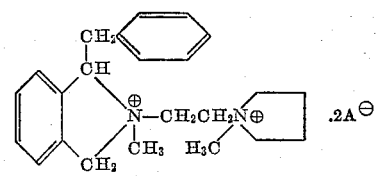

wherein $A^{\ominus}$ may, for example, stand for the anion of a hydrohalic acid, e.g. hydrochloric or hydriodic acid.

The new compounds of this invention may be used as medicaments in the form of pharmaceutical preparations, which contain the new isoindoline derivatives, the salts or the quaternary ammonium compounds thereof in admixture with a pharmaceutical organic or inorganic solid or liquid carrier suitable for enteral or parenteral administration. In antihistaminic preparations they may also be employed topically. For making up the preparations there can be employed substances which do not react with the new compounds, such as water, gelatine, lactose, starches, magnesium stearate, talc, vegetable oils, benzyl alcohols, gums, polyalkylene glycols or any other known carrier for medicaments. The pharmaceutical preparations may be in the solid form, for example, as capsules, tablets or dragees, or in liquid form, for example, as solutions, e.g. isotonic saline solutions, or as suspensions or emulsions. If desired, they may contain auxiliary substances such as preserving agents, stabilizing agents, wetting or emulsifying agents, salts for varying the osmotic pressure or buffers. They may also contain, in combination, other therapeutically useful substances. The dose level at which these compounds are used may vary considerably depending upon the condition of the patient, but the desirable dosage may be easily determined by the practising physician. Generally, however, a quantity from about 1 mg. to about 500 mg. (preferably from about 25 to about 200 mg., especially about 50 mg.) of one of the new active ingredients per dosage unit is safe and effective to relieve conditions for which the drug is intended.

Although several processes may be anticipated for the preparation of the new isoindoline derivatives of this invention, I prefer to prepare the new 1-R-2-tertiary aminoalkyl-isoindolines, salts and quaternary ammonium compounds thereof by reducing in a 2-tertiary aminoalkyl-3-R-phthalimidine or a salt or an optically active antipode thereof the carbonyl group of the phthalimidine ring, and, if desired, converting any resulting salt into the free base, and/or the free base obtained into a salt or a quaternary ammonium compound thereof, and/or a quaternary ammonium compound into another quaternary ammonium derivative. The radical R and the tertiary aminoalkyl group in the above formulae have the meaning previously given.

The conversion of a 2-tertiary aminoalkyl-3-R-phthalimidine into the corresponding isoindoline compound can be brought by methods known to be used for the reduction of an amide grouping. The reagents of choice are di-light metal hydrides; lithium aluminum hydride is preferred, but other reagents such as sodium aluminum hydride or magnesium aluminum hydride may be used as well. Such reagents may also be employed in the presence of a catalyst, such as aluminum chloride. The reduction may also be accomplished by treatment of the phthalimidine with hydrogen in the presence of a catalyst, e.g. copper barium chromite. These chemical reduction reactions are preferably carried out in the presence of a solvent, the choice of which depends on the hydrogenation reagent or type of hydrogenation employed. The solvents of choice in the di-light metal hydride reduction are ethers, e.g. diethylether, tetrahydrofurane or p-dioxane. The reduction with catalytically activated hydrogen is preferably carried out under pressure and acetic acid or an alkanol, e.g. methanol, ethanol or isopropanol, may be used as solvents.

The conversion of a 2-tertiary aminoalkyl-3-R-phthalimidine into the corresponding 1-R-2-tertiary aminoalkyl-isoindoline can also be achieved by electrolytic reduction. Such a reduction may be carried out using a solution of the phthalimidine to be reduced in an aqueous strong inorganic acid, e.g. aqueous sulfuric acid, if desired, with the adidtion of a lower aliphatic carboxylic acid, e.g. acetic acid, as a catholyte, and a cathode of high overvoltage. Cathodes of high overvoltage are those having an overvoltage equal to or higher than lead, such as lead, lead amalgam, zinc amalgam or mercury. It is especially advantageous to work at a cathodic reference potential of —0.8 to —5 volts vs. a saturated calomel electrode depending on the concentration and chemical properties of the component used in the reduction step. Any appropriate anode, such as platinum, carbon, lead or stainless steel, and any appropriate anolyte, for example, dilute sulfuric acid or dilute hydrochloric acid may be employed. A platinum anode and a dilute sulfuric acid anolyte are preferred.

The formation of the isoindoline compounds of this invention may also be achieved simultaneously with the ring closure to the isoindoline ring system by way of a reduction process. Upon treatment of a 2-R-carbonylbenzoic acid N-tertiary aminoalkyl-amide or a salt thereof with a reducing agent, capable of reducing the carbonyl group of an amide to a methylene group, the 1-R-2-tertiary amnioalkyl-isoindoline may be formed. This procedure is particularly suitable for the preparation of 1-R-2-tertiary aminoalkyl-isoindolines, in which R stands for aryl, such as a phenyl, radical. However, it may also be employed for the preparation of isoindolines, in which R stands for an aralkyl group. Thus, a 2-R-carbonyl-benzoic acid N-tertiary aminoalkylamide, in which R stands for an aryl or an aralkyl radical and in which the aromatic nuclei may be unsubstituted or substituted as outlined above, may, upon treatment with a hydrogenating agent, such as a di-light metal hydride, e.g. lithium aluminum hydride, sodium aluminum hydride or magnesium aluminum hydride, which reagents may also be used in the presence of a catalyst, e.g. aluminum chloride, yield directly the desired 1-R-2-tertiary aminoalkyl-isoinodlines, i.e. a 1-aryl- or a 1-aralkyl-2-tertiary aminoalkyl-isoindoline, or salts thereof. Such reaction may be carried out at room temperature or at an elevated temperature, at atmospheric pressure or at an elevated pressure and, if necessary, in the presence of an inert gas, such as nitrogen.

Substituents attached to one of the aromatic nuclei may be converted into other substituents either simultaneously with the formation of the isoindoline derivative or subsequently thereto. For example, a nitro group may be reduced to an amino group under the reduction conditions used for the conversion of phthalimidine to the isoindoline; or, a free hydroxyl group may be converted into a lower alkoxy, e.g. methoxy, or an acyloxy, e.g. acetoxy, group.

Depending on the conditions used, the 1-R-2-tertiary aminoalkyl-isoindolines of this invention are obtained in the form of the free bases or the salts thereof. The salts may be converted into the free bases, for example, by reaction with a basic reagent, e.g. sodium or potassium hydroxide or aqueous ammonia. The free bases may be converted into their therapeutically useful acid addition salts by reaction with one of the inorganic or organic acids outlined hereinbefore, for example, by treating an alkanol, e.g. methanol or ethanol, or an ether, e.g. diethylether, solution of the base with the acid or a solution thereof. The salts may also be obtained as the hemihydrates, monohydrates, sesquihydrates or polyhydrates depending on the conditions used in the formation of the salts.

The quaternary ammonium compounds of the 1-R-2-aminoalkyl-isoindolines may be obtained, for example, by reacting the tertiary bases with an ester formed by a hydroxylated lower hydrocarbon compound with a strong inorganic or organic acid. Hydroxylated lower hydrocarbon compounds contain from 1 to 7 carbon atoms and the esters thereof are more especially those with mineral acids, e.g. hydrochloric, hydrobromic, hydriodic, or sulfuric acid; or strong organic acids, e.g. p-toluene sulfonic acid. Such esters are specifically lower alkyl halides, e.g. methyliodide, methylbromide, methylchloride, ethylbromide, propylchloride; di-lower alkyl sulfates, dimethyl or diethyl sulfate; or lower alkyl arylsulfonates, e.g. methyl p-toluene sulfonate. The quaternizing reactions, such as outlined above, may be performed in the presence or absence of a solvent, at room temperature, at an elevated temperature or under cooling, at atmospheric pressure or in a closed vessel under pressure, and, if desired, in the atmosphere of an inert aga, e.g. nitrogen. Suitable solvents are more especially alkanols, e.g. methanol, ethanol, propanol, isopropanol, butanol or pentanol; or organic acid amides, e.g. formamide or dimethyl-formamide.

Quaternary ammonium compounds obtained may be converted into the corresponding quaternary ammonium hydroxides, for example, by reaction of the quaternary ammonium halides with silver oxide, or by reaction of the sulfates with barium hydroxide or by treating the quaternary ammonium salts with an anion exchanger or by electrodialysis. From any resulting quaternary ammonium base there may be prepared therapeutically suitable quaternary ammonium salts by reaction with acids, for example, those outlined hereinbefore for the preparation of the salts; or with mono-lower alkyl sulfates, e.g. methyl or ethyl sulfate. A quaternary ammonium compound obtained may also be converted directly into another quaternary ammonium salt without formation of the quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol. Quaternary ammonium compounds may also crystallize as the hydrates.

Ordinarily the isoindolines of this invention are obtained in the form of their racemates and may be resolved into the optically active d- and l-forms according to procedures known for the resolution of racemic compounds. For example, the free base of a racemic d, l-1-R-2-tertiary aminoalkyl-isoindoline may be dissolved in a lower alkanol, e.g. methanol or ethanol, and one of the optically active forms of an acid containing an asymmetric carbon atom, or a solution thereof, for example, in the same alkanol or in water or in a mixture of such solvents, is then added, whereupon a salt can be isolated, which is formed by the optically active acid with the optically active form of the base having the same direction of optical rotation. From this salt, the free and optically active base may be obtained according to processes known for the conversion of a salt into a base, for example, as outlined hereinbefore. An optically active base may be converted into a therapeutically useful acid addition salt with one of the acids mentioned hereinbefore. Especially useful as optically active forms of salt forming acids having an asymmetric carbon atom are D- and L-tartaric acid; the optically active forms of malic, mandelic, camphor sulfonic or quinic acid may also be employed. The optically active forms may also be isolated by biochemical methods.

The 2-tertiary aminoalkyl-3-R-phthalimidines and their salts used as starting materials for the preparation of the corresponding isoindolines of this invention are new and are described together with the process for their preparation in my copending U.S. applications Serial No. 632,028, filed on January 2, 1957, and Serial No. 691,136, filed on October 21, 1957. Thus, the 2-tertiary aminoalkyl-3-R-phthalimidines, in which R has the above given meaning, and the salts thereof may be prepared, for example, by treating a phthalide, which is substituted in the 3-position by an aryl, an aralkyl or an aralkylidene group, the aromatic nuclei of which may be unsubstituted or substituted as defined hereinabove, with a tertiary aminoalkylamine in the absence or preferably in the presence of a condensation reagent such as an organic acid, e.g. acetic acid, to form a 2-tertiary aminoalkyl-phthalimidine, which is substituted in the 3-position as described hereinbefore, and, if necessary, converting any aralkylidene into an aralkyl radical by reduction. The reaction of the phthalide with the tertiary aminoalkyl-amine may be carried out in two or, preferably, in one step, i.e. the product of the condensation is subsequently treated with the organic acid, such as acetic acid, or, advantageously, the reaction is performed in the presence of such an acid. The tertiary aminoalkyl radical may also be introduced by reacting a phthalimidine, substituted in the 3-portion by an aryl, an aralkyl or an aralkylidene radical, with a reactive ester formed by a tertiary amino-alkanol and a strong inorganic or organic acid, e.g. hydrochloric, hydrobromic, hydriodic or p-toluene sulfonic acid. Such a reaction may be carried out by reacting a metal salt of the phthalimidine, such as an alkali metal salt, e.g. lithium, sodium or potassium salt, in solution, for example, in a hydrocarbon, e.g. benzene, toluene, or xylene, or in an ether e.g. p-dioxane, with the reactive ester. The metal salt may be prepared, for example, by treating the phthalimidine with an alkali metal hydride or amide, e.g. lithium, sodium or potassium amide or hydride. The reactive ester of the tertiary amino alkanol is then added to the solution of the alkali metal salt of the phthalimidine and the mixture is then preferably heated, for example, to the boiling point of the solvent. The conversion of an aralkylidene into an aralkyl radical by reduction may, for example, be carried out by treatment with hydrogen in the presence of a catalyst, e.g. platinum oxide. The 2-tertiary aminoalkyl-3-R-phthalimidines may be obtained as well as used in the form of the free base or as salts. A free base may be converted into a salt, for example, by treatment with an acid, as outlined above for the corresponding isoindolines. A salt may be converted into the free base, for example, by treatment with a basic reagent, such as sodium hydroxide or aqueous ammonia.

The 2-R-carbonyl-benzoic acid N-tertiary aminoalkylamides used as the starting materials for the direct conversion to the 1-R-2-tertiary aminoalkyl-isoindolines by treatment with a di-light metal hydride, may, for example, be prepared by treating a 2-R-carbonyl-benzoic acid halide, e.g. chloride, with a tertiary aminoalkylamine. This reaction is preferably carried out in the presence of an acid binding agent, such as an alkali metal or an alkaline earth metal carbonate, e.g. sodium carbonate or potassium hydrogen carbonate. Or, upon treatment of a phthalide, which is substituted in the 3-position by an aryl, an aralkyl or an aralkylidene radical with a tertiary aminoalkylamine without an excess of the amine or in a neutral medium, the phthalimidine ring splits open to yield the desired 2-R-carbonylbenzoic acid N-tertiary aminoalkylamide.

This application is a continuation-in-part application of my applications Serial No. 632,027 filed January 2, 1957 (now abandoned) and Serial No. 691,170, filed October 21, 1957 (now abandoned).

The following examples are intended to illustrate the invention and are not be construed as being limitations thereon. Temperatures are given in degrees centigrade.

Example 1

A solution of 9 g. of 2-(2-dimethylaminoethyl)-3-benzylphthalimidine in 50 ml. of dry ether is added with cooling to a suspension of 3 g. of lithium aluminum hydride in 100 ml. of ether. The mixture is refluxed gently then cooled and the excess lithium aluminum hydride destroyed by the addition of ethyl acetate. In order are next added with stirring 4 ml. of water, 8 ml. of 15 percent aqueous sodium hydroxide and 16 ml. of water. This serves to decompose the organic lithium aluminum salt in such a manner as to convert the inorganic salt mixture to a granular form which is easily filtered. After distillation of the ether the 1-benzyl-2-(2-dimethylaminoethyl)-isoindoline is collected as a syrup. The dihydrochloride is prepared by treatment of the free base with an excess of ethanolic hydrogen chloride. After recrystallization from 95 percent ethanol it melts at 200–201° (as the hemihydrate). By using a solution of hydrogen bromide in ethanol, the corresponding dihydrobromide is obtained.

The 2-(2-dimethylaminoethyl)-3-benzyl-phthalimidine used as the starting material may be obtained, for example, by reacting 3-benzal-phthalide with N,N-dimethyl-ethylenediamine in the presence of acetic acid and the crude 2-(2-dimethylaminoethyl)-3-benzal-phthalimidine thus-obtained is hydrogenated in the presence of a catalyst, e.g. platinum oxide, yielding the syrupy 2-(2-dimethylaminoethyl)-3-benzyl-phthalimidine the hydrochloride of which melts at 200°.

Example 2

2 g. of 1-benzyl-2-(2-dimethylaminoethyl)-isoindoline dihydrochloride (Example 1) is converted to the free base by basifying an aqueous solution thereof with aqueous ammonia, extracting with ether and distilling off the ether. The residue is dissolved in 10 ml. of ethanol and treated with 0.8 g. of methyliodide. After 12 hours standing at room temperature, the methiodide crystallizes from the reaction mixture. The 1-benzyl-2-(2-dimethylaminoethyl)-isoindoline monomethiodide is recrystallized from water, M.P. 130°.

Example 3

A solution of 3 g. of crude 1-benzyl-2-(2-dimethylaminoethyl)-isoindoline (Example 1) in 30 ml. of ethanol is refluxed for 24 hours with 5 ml. of methyliodide. The crystalline 1-benzyl-2-(2-dimethylaminoethyl)-isoindoline dimethiodide is collected and recrystallized from water, M.P. 190°.

Example 4

When the 2-(3-dimethylaminopropyl)-3-benzyl-phthalimidine, the hydrochloride of which melts at 180–181°, is treated with lithium aluminum hydride according to the procedure described in Example 1, the 1-benzyl-2-(3-dimethylaminopropyl)-isoindoline dihydrochloride, melting at 205°, is obtained.

The 2-(3-dimethylaminopropyl)-3-benzyl-phthalimidine used as the starting material may be obtained by refluxing the 3-benzal-phthalide with N,N-dimethyl-1,3-propylene-diamine in acetic acid and hydrogenating the 2-(3-dimethylaminopropyl)-3-benzal-phthalimidine, the hydrochloride of which melts at 225°, in the presence of platinum oxide to the 2-(3-dimethylaminopropyl)-3-benzyl-phthalimidine.

Example 5

According to the procedure described in Example 2, 1-benzyl-2-(3-dimethylaminopropyl)-isoindoline is reacted with one molar equivalent of methyliodide to produce the monomethyliodide of 1-benzyl-2-(3-dimethylaminopropyl)-isoindoline melting at 135–136° after recrystallization from a mixture of ethanol and ethyl acetate.

Example 6

Reaction of 1-benzyl-2-(3-dimethylaminopropyl)-isoindoline with an excess of methyliodide as described in Example 3 leads to the corresponding dimethiodide of 1-benzyl-2-(3-dimethylaminopropyl)-isoindoline melting at 125–130° after recrystallization from water.

Example 7

Treatment of the 2-(2-dimethylaminoethyl)-3-(4-chlorobenzyl)-phthalimidine, the hydrochloride of which melts at 235°, with lithium aluminum hydride according to the procedure described in Example 1 yields the 1-(4-chlorobenzyl)-2-(2-dimethylaminoethyl)-isoindoline dihydrochloride, M.P. 240°.

The 2-(2-dimethylaminoethyl)-3-(4-chlorobenzyl)-phthalimidine used as the starting material may be prepared by reacting the 3-(4-chlorobenzal)-phthalide with an acetic acid solution of N,N-dimethyl-ethylenediamine and hydrogenating the 2-(2-dimethylaminoethyl)-3-(4-chlorobenzal)-phthalimidine, the hydrochloride of which melts at 245°, in the presence of platinum oxide to yield the 2-(2-dimethylaminoethyl)-3-(4-chlorobenzyl)-phthalimidine.

Example 8

Treatment of the 2-(2-dimethylaminoethyl)-3-benzyl-4,5,6,7-tetrachloro-phthalimidine, M.P. 170–171°, with lithium aluminum hydride according to the procedure given in Example 1 yields the 1-benzyl-2-(2-dimethylaminoethyl)-4,5,6,7-tetrachloroisoindoline dihydrochloride, which after recrystallization from a mixture of ethanol and ether melts at 216–220°.

The 2-(2-dimethylaminoethyl)-3-benzyl-4,5,6,7-tetrachloro-phthalimidine used as the starting material may be prepared as follows: 3-benzal-4,5,6,7-tetrachlorophthalide reacts with N,N-dimethyl-ethylenediamine in benzene and subsequent treatment with acetic acid anhydride yields the 2-(2-dimethylaminoethyl)-3-benzal-4,5,6,7-tetrachloro-phthalimidine, melting at 45°, which is then hydrogenated in the presence of platinum oxide to the 2-(2 - dimethylaminoethyl) - 3 - benzyl - 4,5,6,7 - tetrachloro-phthalimidine, which after recrystallization from a mixture of ethanol and water melts at 170–171°.

Example 9

A solution of 20 g. of 2-benzoyl-benzoic acid N-(2-N,N-dimethylaminoethyl)-amide in 125 ml. of dry tetrahydrofurane is added dropwise with stirring and cooling to a solution of 8 g. of lithium aluminum hydride in 300 ml. of ether. The excess of lithium aluminum hydride is destroyed with ethylacetate and the reaction mixture worked up as described in Example 1. The dihydrochloride of the crude 1-phenyl-2-(2-dimethylaminoethyl)-isoindoline is prepared by treatment with alcoholic hydrogen chloride, and after recrystallization from a mixture of ethanol and ether melts at 163–165°.

The 2-N,N-dimethylaminoethylamide of 2-benzol-benzoic acid used as a starting material may be prepared as follows: To a solution of 50 g. of 2-benzoyl-benzoyl chloride in 100 ml. of benzene is added 50 ml. of N,N-dimethyl-ethylene-diamine with stirring and external cooling. The 2-N,N-dimethylaminoethylamide of 2-benzoyl-benzoic acid solidifies upon standing overnight and is recrystallized from ethyl acetate, melting at 136–137°.

Example 10

2 g. of the crude 1-phenyl-2-(2-dimethylaminoethyl)-isoindoline (Example 9) is dissolved in 10 ml. of ethanol and treated with 2 ml. of methyliodide. After 30 minutes the monomethiodide of 1-phenyl-2-dimethylaminoethyl-isoindoline monomethiodide crystallizes and is recrystallized from ethanol, M.P. 244–245°.

Example 11

Upon treatment of the 2-(2-diethylaminoethyl)-3-benzyl-phthalimidine with lithium aluminum hydride according to the procedure described in Example 1, the 1-benzyl-2-(2-diethylaminoethyl)-isoindoline dihydrochloride is obtained, which melts at 192–193°. The corresponding dioxalate, prepared by treatment of a concentrated ethanolic solution of the base with a concentrated solution of oxalic acid in ethanol, melts at 165°. The ditartrate can be produced by the same method using tartaric acid instead of oxalic acid.

The 2-(2-diethylaminoethyl) - 3 - benzyl-phthalimidine used as the starting material may be prepared by reacting 3-benzal-phthalide with N,N-diethyl-ethylenediamine in acetic acid and reducing the 2-(2-diethylaminoethyl)-3-benzal-phthalimidine, the hydrochloride of which melts at 204–205°, with hydrogen in the presence of platinum oxide to the 2-(2-diethylaminoethyl)-3-benzyl-phthalimidine.

Example 12

2 g. of the 1-benzyl-2-(2-diethylaminoethyl)-isoindoline (Example 11) is refluxed with 5 ml. of methyliodide in 20 ml. of ethanol for 6 hours. Most of the ethanol is distilled off and ethyl acetate added to precipitate the gummy material. The latter crystallizes on trituration with a small amount of ethanol and is recrystallized from a mixture of ethanol and water yielding the 1-benzyl-2-(2 - diethylaminoethyl)-isoindoline dimethiodide, M.P. 170° (decomposition).

Example 13

Treatment of 2-[2-morpholino-(N)-ethyl] - 3 - benzyl-phthalimidine, the hydrochloride of which melts at 198–200°, with lithium aluminum hydride in dry ether according to the procedure described in Example 1 yields the 1-benzyl-2-[2-morpholino-(N)-ethyl]-isoindoline dihydrochloride, M.P. 240–241°. The corresponding dioxalate melts at 215–216°.

The 2 - [2-morpholino-(N)-ethyl]-3-benzyl-phthalimidine used as the starting material may be prepared by reacting 3-benzal-phthalide with 2-morpholino-(N)-ethylamine in acetic acid and hydrogenating the obtained 2-[2-morpholino-(N)-ethyl]-3-benzal-phthalimidine, the hydrochloride of which melts at 225–226°, in the presence of platinum oxide to the 2-[2-morpholino-(N)-ethyl]-3-benzyl-phthalimidine, isolated as the hydrochloride, M.P. 198–200°.

Example 14

The 2 - (2-dimethylaminoethyl)-3-(3-methoxybenzyl)-phthalimidine, the hydrochloride of which melts at 124–126°, when treated with lithium aluminum hydride in the presence of dry ether according to the procedure given in Example 1, yields the 1-(3-methoxybenzyl)-2-(2-dimethylaminoethyl)-isoindoline which is isolated as the dihydrochloride, M.P. 228–230°. The dioxalate prepared according to the method given in Example 11 melts at 187–188°.

The dimethiodide of 1-(3-methoxybenzyl)-2-(2-dimethylaminoethyl)-isoindoline prepared according to the procedure outlined in Example 3 melts after recrystallization from a mixture of ethanol and water at 190° (decomposition).

The 2 - (2-dimethylaminoethyl)-3-(3-methoxybenzyl)-phthalimidine used as the starting material may be prepared as follows: 3-(3-methoxybenzal)-phthalide, M.P. 114–115°, prepared by heating a mixture of 3-methoxyphenyl-acetic acid, phthalic acid anhydride and anhydrous sodium acetate to 230–240°, is reacted with an equimolar quantity of N,N-dimethyl-ethylenediamine in the presence of acetic acid and the thus-obtained 2-(2-dimethylaminoethyl)-3-(3-methoxybenzal)-phthalimidine, the hydrochloride of which melts at 46–48°, is treated with hydrogen in the presence of platinum oxide to yield the 2-(2 - dimethylaminoethyl) - 3 - (3-methoxybenzyl)phthalimidine.

Example 15

Treatment of the 2-(2-dimethylaminoethyl)-3-(3,4-dimethoxy-benzyl)-phthalimidine with lithium aluminum hydride in the presence of dry ether according to the procedure described in Example 1 yields the 1-(3,4-dimethoxybenzyl)-2-(2-dimethylaminoethyl)-isoindoline which is isolated in the form of its dihydrochloride, melting at 225–226° after recrystallization from a mixture of ethanol (95 percent) and ether. The dioxalate melts at 187–188°.

The 2-(2-dimethylaminoethyl) - 3 - (3,4 - dimethoxybenzyl)-phthalimidine used as the starting material may be prepared as follows: The 3-(3,4-dimethoxybenzal)-phthalide, M.P. 114–115°, prepared by treating 3,4-dimethoxyphenyl-acetic acid with phthalic acid anhydride in the presence of anhydrous sodium acetate, is treated with N,N-dimethyl-ethylenediamine in the presence of acetic acid, and the thus-obtained 2-(2-dimethylaminoethyl)-3-(3,4-dimethoxybenzal)-phthalimidine, M.P. 128–130°, the hydrochloride of which melts at 242–246°, is hydrogenated in the presence of platinum oxide to the 2-(2-dimethylaminoethyl) - 3 - (3,4 - dimethoxybenzyl)-phthalimidine, isolated as the hydrochloride, M.P. 154–155°.

Example 16

Treatment of the 2-(2-dimethylaminoethyl)-3-benzyl-5-(or 6)-chloro-phthalimidine with lithium aluminum hydride according to the procedure described in Example 1 in the presence of dry ether yields the 1-benzyl-2-(2-dimethylaminoethyl)-5(or 6)-chloro-isoindoline in which the chlorine atom is either in the 5- or the 6-position and which is isolated in the form of the dihydrochloride, M.P. 228–229°.

The monomethiodide of 1-benzyl-2-(2-dimethylaminoethyl)-5(or 6)-chloro-isoindoline obtained according to the procedure outlined in Example 2 melts after recrystallization from ethanol at 190–191° (with decomposition).

The dimethiodide of 1-benzyl-2-(2-dimethylaminoethyl)-5(or 6)-chloro-isoindoline obtained according to the procedure given in Example 3 melts after recrystallization from water at 228–229°.

The 2-dimethylaminoethyl-3-benzyl-5(or 6)-chloro-phthalimidine used as the starting material may be prepared as follows: 3-benzal-5(or 6)-chloro-phthalide, which is prepared by heating a mixture of phenylacetic acid, 4-chloro-phthalic acid anhydride and anhydrous sodium acetate to 230–240° and which melts at 175° after recrystallization from acetic acid, is reacted with N,N-dimethyl-ethylenediamine in the presence of acetic acid and the thus-obtained 2-(2-dimethylaminoethyl)-3-benzal-5(or 6)-chloro-phthalimidine (hydrochloride, M.P. 240–243°) is treated with hydrogen in the presence of platinum oxide to give 2-(2-dimethylaminoethyl)-3-benzyl-5(or 6)-chloro-phthalimidine, the hydrochloride of which melts at 175–176°.

*Example 17*

By treatment of the 2-(2-dimethylaminoethyl)-3-(3-methyl-benzyl)-phthalimidine with lithium aluminum hydride according to the procedure outlined in Example 1, the 1-(3-methyl-benzyl)-2-(2-dimethylaminoethyl)-isoindoline dihydrochloride is obtained, which melts after recrystallization from ethanol at 250° as the hemihydrate.

The starting material may be prepared by treating phthalic acid anhydride with 3-methyl-phenyl acetic acid in the presence of anhydrous sodium acetate, condensing the resulting product with N,N-dimethyl-ethylenediamine and converting the 2-(2-dimethylaminoethyl)-3-(3-methyl-benzal)-phthalimidine to the 2-(2-dimethylaminoethyl)-3-(3-methyl-benzyl)-phthalimidine by reduction with hydrogen in the presence of platinum oxide.

Instead of using the 2-(2-dimethylaminoethyl)-3-(3-methyl-benzyl)-phthalimidine, the corresponding 2-(2-dimethylaminoethyl)-3-(4-bromo-benzyl)-phthalimidine may be used to produce the 1-(4-bromo-benzyl)-2-(2-dimethylaminoethyl)-isoindoline.

*Example 18*

The 1-(4-methyl-benzyl)-2-(2-dimethylaminoethyl)-isoindoline dihydrochloride, M.P. 246–248°, is obtained by treating the 2-(2-dimethylaminoethyl)-3-(4-methyl benzyl)-phthalimidine, the hydrochloride of which melts at 188–190°, according to the procedure described in Example 1.

The phthalimidine used as the starting material is prepared by reacting the 2-(4-methyl-benzal)-phthalide with N,N-dimethyl-ethylenediamine and subsequent reduction of the double bond in the 3-position of the 2-(2-dimethylaminoethyl)-3-(4-methyl-benzal)-phthalimidine, the hydrochloride of which melts at 228–229°, with catalytically activated hydrogen.

*Example 19*

By treating 2-(4-dimethylaminobutyl)-3-benzyl-isoindoline according to the procedure outlined in Example 1, the 1-benzyl-2-(4-dimethylaminobutyl)-isoindoline dihydrochloride is obtained and melts after recrystallization from a mixture of ethanol-ether at 175–178°.

The monomethiodide of the 1-benzyl-2-(4-dimethylaminobutyl)-isoindoline is obtained according to the procedure described in Example 2 and after recrystallization from water melts as the hydrate at 130° (decomposition).

The starting material may be prepared by reducing the 2-(4-dimethylaminobutyl)-3-benzal-phthalimidine, the hydrochloride of which melts after recrystallization from a mixture of methanol and ether at 175°, to the corresponding 3-benzyl-derivative, which is used without further purification.

*Example 20*

The 1-benzyl-2-(3-diethylaminopropyl)-isoindoline dioxalate is obtained from 2-(3-diethyl-aminopropyl)-3-benzyl-phthalimidine according to the procedure described in Example 1 and recrystallized from a mixture of ethanol and water, M.P. 187°. The corresponding dihydrochloride is recrystallized from a mixture of methanol and ether, M.P. 165°.

The methiodide of 1-benzyl-2-(3-diethylaminopropyl)-isoindoline is prepared according to the procedure given in Example 1 and is identified as the Reinecake salt, M.P. 105–110°.

The starting material used in the above example may be prepared according to a process analogous to that previously described and is used without purification.

*Example 21*

By treating the 2-(2-dimethylaminoethyl)-3-benzyl-7-chloro-phthalimidine according to the process outlined in Example 1 the 1-benzyl-2-(2-dimethylaminoethyl)-4-chloro-isoindoline dihydrochloride is obtained, melting after recrystallization from a mixture of ethanol and ether at 218–220°. The corresponding dioxalate melts at 176–178° after recrystallizatoin from a mixture of ethanol and water.

The starting material used in the above reaction may be prepared by treating the 3-benzal-7-chloro-phthalide with N,N-dimethyl-ethylenediamine and reducing the resulting 2-(2-dimethylaminoethyl)-3-benzal-7-chloro-phthalimide, M.P. 98°, to the 2-(2-dimethylaminoethyl)-3-benzyl-7-chloro-phthalimidine, the hydrochloride of which melts at 280° after recrystallization from a mixture of ethanol and ether.

*Example 22*

The 1-benzyl-2-(3-dimethylaminopropyl)-4,5,6,7-tetrachloro-isoindoline dihydrochloride is obtained from 2-(3-dimethylaminopropyl)-3-benzyl-4,5,6,7-tetrachloro-phthalimidine according to the procedure described in Example 1 and melts after recrystallization from a mixture of ethanol and ether at 175–178°.

The monomethiodide, which is not obtained in crystalline form, is characterized by adding an aqueous solution of ammonium Reineckate to an ethanolic solution of the methiodide of 1-benzyl-2-(3-dimethylaminopropyl)-4,5,6,7-tetrachloroisoindoline and the crude Reineckate is recrystallized from aqueous acetone, M.P. 145–150°

The starting material may be prepared by reacting 3-benzal-4,5,6,7-tetrachloro-phthalide with N,N-dimethyl-1,3-propylenediamine and converting by reduction the resulting 2-(3-dimethylaminopropyl)-3-benzal-4,5,6,7-tetrachloro-phthalimidine, the hydrochloride of which melts at 300°, into the 2-(3-dimethylaminopropyl)-3-benzyl-4,5,6,7-tetrachloro-phthalimidine, M.P. 115–116°, the hydrochloride of which melts at 155°.

*Example 23*

The 1-benzyl-2-[5-dimethylamino-pentyl-(2)]-isoindoline, B.P. 200°/0.1 mm., is prepared from 2-[5-dimethylaminopentyl-(2)]-3-benzyl-phthalimidine according to the procedure described in Example 1.

The starting material may be prepared by treating 3-benzalphthalide with 4-dimethylamino-pentylamine and converting the 2-[5-dimethylamino-pentyl-(2)]-3-benzalphthalimidine, the hydrochloride of which melts at 172–173°, to the 2-[5-dimethylamino-pentyl-(2)]-3-benzyl-phthalimidine which is used without further purification.

*Example 24*

By reducing the crude 2-(2-diethylaminoethyl)-3-benzyl-5(or 6)-chloro-phthalimidine with lithium aluminum hydride according to the process described in Example 1, the 1-benzyl-2-(2-diethylaminoethyl)-5(or 6)-chloro-isoindoline dioxalate is obtained and recrystallized from a mixture of ethanol and ether, M.P. 112–115°.

The starting material used in the above reaction may be prepared according to a procedure analogous to that de-

Example 25

The 1-(3,4,5-trimethoxybenzyl)-2-(2 - dimethylamino-ethyl)-isoindoline dihydrochloride is prepared from the 2-(2-dimethylaminoethyl) - 3 - (3,4,5-trimethoxybenzyl)-phthalimidine according to the process outlined in Example 1, and melts after recrystallization from ethanol at 226°.

The starting material used in the above reaction may be prepared by treating the 3-(3,4,5-trimethoxy-benzal)-phthalide with N,N-dimethyl-ethylenediamine and converting the resulting 2-(2-dimethylaminoethyl)-3-(3,4,5-trimethoxybenzal)-phthalimidine, the hydrochloride of which melts at 275–276°, to the 2-(2-dimethylaminoethyl)-3-(3,4,5-trimethoxybenzyl)-phthalimidine by reduction; the hydrochloride of the latter melts at 198°.

Example 26

The 1-benzyl-2-(3-diethylaminopropyl)-5(or 6)-chloro-isoindoline dioxalate is prepared from 2-(3-diethylamino-propyl)-3-benzyl-5(or 6)-chloro-phthalimidine according to the process outlined in Example 1, and melts after recrystallization from a mixture of methanol and water at 162–163°. An aqueous solution of the hydrochloride salt may be prepared by adding the stoichiometric amount of an aqueous solution of hydrochloric acid to the free base.

The starting material used in the above reaction may be prepared according to a procedure analogous to that outlined hereinbefore and is used without further purification.

Example 27

By reducing the 2-[2-pyrrolidino-(N)-ethyl]-3-benzyl-phthalimidine with lithium aluminum hydride according to the procedure outlined in Example 1 the 1-benzyl-2-[2-pyrrolidino-(N)-ethyl]-isoindoline dihydrochloride is obtained, melting at 255° after recrystallization from a mixture of methanol and ethanol.

The monomethiodide, M.P. 185–186° (decomposition) after recrystallization from ethanol, and the dimethiodide of 1-benzyl-2-[2-pyrrolidino-(N)-ethyl]isoindoline, M.P. 160° (as the monohydrate, decomposition) after recrystallization from water, are prepared according to the procedures described in Examples 2 and 3 respectively. The dimethiodide can be converted into the dimethochloride by shaking an aqueous solution of the former with an excess of freshly prepared silver chloride and filtering the mixture; after evaporation the crystalline dimethochloride of 1-benzyl-2-[2-pyrrolidino-(N)-ethyl]-isoindoline is obtained.

The starting material may be prepared by treating the 3-benzalphthalide with 2-pyrrolindino - (N) - ethylamine and converting the resulting 2-[2-pyrrolidino-(N)-ethyl]-3-benzal-phthalimidine, the hydrochloride of which melts at 248–250°, into the 2-[2-pyrrolindino-(N)-ethyl]-3-benzyl-phthalimidine, the hydrochloride of which melts at 173–174°, by reduction.

Example 28

The 1-(2-chlorobenzyl) - 2 - (2 - dimethylaminoethyl)-isoindoline dihydrochloride melting after recrystallization from a mixture of ethanol and ether at 208° is prepared from 2-(2 - dimethylaminoethyl) - 3 - (2 - chlorobenzyl)-phthalimidine according to the procedure described in Example 1.

The starting material used may be prepared by treating the 3-(2-chlorobenzal) - phthalide with N,N - dimethyl-ethylene-diamine and converting the resulting 2-(2-dimethylaminoethyl) - 3 - (2-chlorobenzal) - phthalimidine, M.P. 105°, the hydrochloride of which melts at 199–200°, to the 2-(2-dimethylaminoethyl) - 3 - (2 - chlorobenzyl)-phthalimidine, the hydrochloride of which melts at 115–117°, by reduction.

Example 29

200 g. of 1-benzyl-2-(2-dimethylaminoethyl)-isoindoline dihydrochloride (Example 1) is suspended in 100 ml. of water and 200 ml. of ether is added. An excess of aqueous ammonia converts the salt into the free base, which is extracted with ether. The ether solution is dried over sodium sulfate and the ether evaporated. The oil residue is dissolved in about 250 ml. of ethanol and a solution of 180 g. of L-tartaric acid in 400 ml. of water is added while stirring. The crystalline precipitate is filtered off and washed with ethanol. The di-L-tartrate of the optically active l-1-benzyl-2-(2-dimethyl-aminoethyl)-isoindoline, M.P. 205° [α]$_D$=—20.5 (in water), is converted into the base by suspending in water, adding ether and an excess of an aqueous solution of ammonia while stirring, extracting the aqueous solution with ether, and drying the ether solution over sodium sulfate. The ether is evaporated off, ethanol is added to the residue and the solution is treated with a 6 N solution of hydrochloric acid in ethanol. The dihydrochloride of the optically active l-1-benzyl-2-(2-dimethylaminoethyl)-isoindoline is filtered off, washed with acetone and recrystallized from ethanol, M.P. 217–220° (as the hemi-hydrate); [α]$_D$=—9 (in water).

The ethanolic mother's liquor remaining after the removal of the di-L-tartrate of the l-1-benzyl-2-(2-dimethyl-aminoethyl)-isoindoline is evaporated to dryness, an excess of an aqueous solution of ammonia is added and the mixture extracted with ether, which solution is dried over sodium sulfate. The ether is evaporated and the residue dissolved in 200 ml. of ethanol and a solution of 90 g. of D-tartaric acid in 180 ml. of water is added. The crystalline di-D-tartrate of the optically active d-1-benzyl-2-(2-dimethylaminoethyl)-isoindoline $$[\alpha]_D = +24.5$$

(in water) which precipitates, is filtered off and converted into the hemihydrate of the dihydrochloride of the optically active d-1-benzyl-2-(2-dimethylaminoethyl)-isoindoline according to the previously described procedure, M.P. 218–220° [α]$_D$=+9 (in water).

Example 30

The 1-(4-hydroxybenzyl) - 2 - (2-dimethylaminoethyl)-isoindoline dioxalate, melting at 113–115° after recrystallization from a mixture of ethanol and water, is prepared from the 2-(2-dimethylaminoethyl)-3-(4-hydroxybenzyl)-phthalimidine according to the process described in Example 1.

The starting material used may be prepared by treating the 3-(4-hydroxybenzal)-phthalide with N,N-dimethyl-ethylene-diamine, converting the resulting 2-(2-dimethyl-aminoethyl)-3-(4-hydroxybenzal)-phthalimidine, the hydrochloride of which melts at 153–155° to the 2-(2-dimethylaminoethyl)-3-(4 - hydroxybenzyl) - phthalimidine by reduction and the latter is used without further purification.

Example 31

The dioxalate of 1-(2-methyl-benzyl)-2-(2-dimethyl-aminoethyl)-isoindoline melts after recrystallization from a mixture of methanol and water at 183–184° and is prepared by treating 2-(2-dimethylaminoethyl)-3-(2-methyl-benzyl)-phthalimidine according to the process described in Example 1.

The starting material used may be prepared according to the procedure outlined hereinbefore and is used without further purification.

Example 32

By treating the 2-[2-(4-methyl-piperazino-1)-ethyl]-3-benzyl-phthalimidine according to the process described in Example 1, the trihydrochloride of 1-benzyl-2-[2-(4-methylpiperazino-1)-ethyl]-isoindoline is obtained and melts after recrystallization from ethanol at 252°.

The dimethiodide of 1-benzyl-2-[2-(4-methyl-piperazino-1)-ethyl]-isoindoline prepared according to the process described in Example 2, melts after recrystallization from a mixture of ethanol and water at 226–228° (as the monohydrate).

The starting material used in the above reaction may be prepared by treating 3-benzal-phthalide with 2-(4-methyl-piperazino-1)-ethylamine and converting by reduction the resulting 2-[2-(4-methyl-piperazino-1)-ethyl]-3-benzal-phthalimidine, the dihydrochloride of which melts at 275°, into 2-[2-(4-methyl-piperazino-1)-ethyl]-3-benzyl-phthalimidine, the dihydrochloride of which melts at 265°.

*Example 33*

The 1-benzyl - 2 - [3-(4-methyl-piperazino-1) - propyl]-isoindoline trihydrochloride, M.P. 250–255°, after recrystallization from a mixture of ethanol and water, is prepared by treating 2-[3-(4-methyl-piperazino-1)-propyl]-3-benzal-phthalimidine according to the process outlined in Example 1.

The trimethiodide of 1-benzyl-2-[3-(4-methylpiperazino-1)-propyl]-isoindoline, obtained by treatment of the base with methyliodide according to the process described in Example 2, melts at 210° after recrystallization from water.

The starting material used in the above reaction may be prepared by treating 3-benzal-phthalide with 3-[4-methyl-piperazino-(1)]-propylamine and converting by reduction the resulting 2-[3-(4-methyl-piperazino-1)-propyl]-3-benzal-phthalimidine, the dihydrochloride of which melts at 265–266°, into the 2-[3-(4-methyl-piperazino-1)-propyl]-3-benzal-phthalimidine, the dihydrochloride of which melts at 240–241°.

*Example 34*

The 1-benzyl-2 - (3 - dimethylaminopropyl)-5(or 6)-chloroisoindoline dihydrochloride melts after recrystallization at 276° and is prepared by treating the 2-(3-dimethylaminopropyl)-3-benzyl-5(or 6-chloro-phthalimidine according to the procedure outlined in Example 1.

The methiodide of 1-benzyl-2-(3-dimethylaminopropyl)-5(or 6)-chloro-isoindoline prepared according to the process outlined in Example 2, melts after recrystallization from water at 210°.

The starting material used in the above reaction may be prepared by reacting the 3-benzal-5(or 6)-chloro-phthalide with N,N-dimethyl-1,3-proplenediamine and converting by reduction the resulting 2-(3-dimethylaminopropyl)-3-benzal-5(or 6)-chloro-phthalimidine, the hydrochloride of which melts at 265°, into the 2-(3-dimethylaminopropyl) - 3 - benzyl - 5(or 6)-chloro-phthalimidine, which is used without further purification.

*Example 35*

The 1-(3 - phenylpropyl) - 2 - (2-dimethylaminoethyl)-isoindoline dihydrochloride melts after recrystallization from a mixture of ethanol and ether at 216–217° and is prepared by treating 2 - (2 - dimethylaminoethyl)-3-(3-phenylpropyl)-phthalimidine according to the process described in Example 1.

The starting material may be prepared by treating 3-[3-phenyl-propene-(2)-ylidene]-phthalide, obtained from the reaction of phthalic acid anhydride and 4-phenyl-butene-(3)-oic acid in the presence of sodium acetate, with N,N-dimethylethylenediamine and converting by reduction the resulting 2 - (2 - dimethylaminoethyl)-3-(3-phenyl-propene-(2)-ylidene)-phthalimidine, M.P. 105–106°, into the 2-(2-dimethylaminoethyl)-3-(3-phenylpropyl)-phthalimidine, which is used without further purification.

*Example 36*

By treating the 2-[3-morpholino-(N)-propyl]-3-benzyl-phthalimidine according to the process outlined in Example 1, the dihydrochloride of 1-benzyl-2-[3-morpholino-(N)-propyl]-isoindoline is obtained, M.P. 195° after recrystallization from a mixture of ethanol and ether.

The dimethiodide of 1-benzyl-2-[3-morpholino-(N)-propyl]-isoindoline, prepared according to the method outlined in Example 3, melts at 220–222° after recrystallization from a mixture of ethanol and water (as the monohydrate).

The starting material may be prepared by treating 3-benzal-phthalide with 3-morpholino - (N) - propylamine and converting by reduction the resulting 2-[3-morpholino-(N)-propyl]-3-benzal-phthalimidine, the hydrochloride of which melts at 215°, into the 2-[3-morpholino-(N)-propyl]-3-benzyl-phthalimidine, the hydrochloride of which melts at 225°.

*Example 37*

A solution of a tenth of a mole of 2-phenacetyl-benzoic acid N-(2-dimethylaminoethyl)-amide in 100 ml. of dry ether is added to a suspension of an excess of lithium aluminum hydride in dry ether. The mixture is gently refluxed, cooled and the excess lithium aluminum hydride destroyed by adding ethyl acetate. The thus obtained 1-benzyl-2-(2-dimethylaminoethyl)-isoindoline is isolated and purified according to the procedure given in Example 1, and does not show any difference with the product obtained according to the procedure of that example.

The starting material used in this reaction may be prepared as follows: To a suspension of 5 g. of 3-benzal-phthalide in 50 ml. of ethanol is added while stirring 2.5 ml. of N,N-dimethyl-ethylenediamine and the mixture warmed for 5 minutes to complete the reaction. The ethanol is concentrated under reduced pressure to a small volume, water is added and the solid separating is filtered. The 2-phenylacetyl-benzoic acid N-(2-dimethylaminoethyl)-amide melts at 100°.

*Example 38*

By reducing 2-(2-dimethylaminoethyl) - 3 - (1-phenylethyl)-phthalimidine with lithium aluminum hydride according to the procedure described in Example 1, the 1-(1-phenylethyl) - 2 - (2-dimethylaminoethyl)-isoindoline may be obtained, which may be characterized as the dihydrochloride.

The starting material may be prepared by reacting phthalic acid anhydride with 2-phenyl-propionic acid, the resulting phthalide with N,N-dimethyl-ethylenediamine in the presence of acetic acid and reducing the carbon-carbon double bond of the 2-(2-dimethylaminoethyl)-3-(1-phenyl-ethylidene)-phthalimidine with hydrogen in the presence of platinum oxide.

*Example 39*

A solution of 6.04 g. of 2-(2-dimethylaminoethyl-3-benzyl-phthalimidine in a mixture of 30 ml. of acetic acid, 36 ml. of water and 9 ml. of sulfuric acid is placed into the cathode chamber containing a lead cathode of 64.9 cm.$^2$ surface. The cathode chamber is separated from the anode chamber by a semipermeable ion exchange resin membrane (Amberplex membrane). The anolyte consists of a mixture of 66 ml. of water and 9 ml. of sulfuric acid and a platinum anode is used. At a temperature of 45–50° the current density is 0.0493 amperes/cm.$^2$ and after 150 minutes the reaction is discontinued.

The catholyte is evaporated to half of the volume, made basic with a 10% aqueous solution of potassium hydroxide and then extracted with ether, which solution is washed with water and dried over sodium sulfate. The oily residue is dissolved in 25 ml. of ethanol to which is added an ethanolic solution of hydrogen-chloride and then ether until the formation of a slight turbidity. After refrigeration the 1-benzyl - 2 - (2 - dimethylaminoethyl)-isoindoline dihydrochloride, M.P. 199–201°, is filtered off and shows no melting point depression with the product obtained according to the procedure described in Example 1.

Example 40

By using the procedure described in Example 1, the 2-(2-dimethylaminoethyl)-3-[naphthyl-(2)-methyl]-phthalimidine is converted to the 1-[naphthyl-(2)-methyl]-2-(2-dimethylaminoethyl-isoindoline, the dihydrochloride of which melts at 265°.

The starting material may be prepared by treating naphthyl-(2)-acetic acid with phthalic acid anhydride in the presence of sodium acetate, converting the resulting 3-[naphthyl-(2)-methylene]-phthalide, M.P. 167°, by reaction with N,N-dimethyl-ethylenediamine in the presence of acetic acid into the 2-(2-dimethylaminoethyl)-3-[naphthyl-(2)-methylene]-phthalimidine, the hydrochloride of which melts at 212–214°, and hydrogenating the latter in the presence of platinum oxide to the 2-(2-dimethylaminoethyl)-3-[naphthyl-(2)-methyl]-phthalimidine, the hydrochloride of which melts at 188–190°.

Example 41

The 1-[naphthyl-(1)-methyl]-2-(2-dimethylaminoethyl)-isoindoline is obtained by treating 2-(2-dimethylaminoethyl)-3-[naphthyl-(1)-methyl]-phthalimidine with lithium aluminum hydride according to the procedure given in Example 1; the dioxalate melts at 209–210° after recrystallization of a mixture of ethanol and water.

By reacting the 1-[naphthyl-(1)-methyl]-2-(2-dimethylaminoethyl)-isoindoline with methyliodide according to the procedure described in Example 2, the monomethiodide of 1-[naphthyl-(1)-methyl]-2-(2-dimethylaminoethyl)-isoindoline can be obtained.

The starting material may be prepared by reacting naphthyl-(1)-acetic acid with phthalic acid anhydride in the presence of sodium acetate to produce the 3-[naphthyl-(1)-methylene]-phthalide, M.P. 156–157°, treating the latter with N,N-dimethyl-ethylenediamine in the presence of acetic acid and hydrogenating the resulting 2-(2-dimethylaminoethyl)-3-[napthyl-(1)-methylene]-phthalimidine in the presence of platinum oxide to the desired 2-(2-dimethylaminoethyl)-2-[naphthyl-(1)-methyl]-phthalimidine, which is used without further purification.

Example 42

By treating the 2-[1-methyl-piperidino-(3)-methyl]-3-benzyl-phthalimidine with lithium aluminum hydride according to the procedure outlined in Example 1, the 1-benzyl-[1-methyl-piperidino-(3)-methyl]-isoindoline can be prepared, which is characterized as the dioxalate.

The starting material may be prepared by treating a toluene solution of 3-benzal-phthalimidine with sodium hydride and then with 1-methyl-piperidino-(3)-methylchloride and reducing the resulting 2-[1-methyl-piperidino-(3)-methyl]-3-benzal-phthalimidine with hydrogen in the presence of platinum oxide.

Example 43

The 1-benzyl-2-(2-dimethylaminoethyl)-isoindoline dihydrochloride described in Example 1 may be formulated into orally applicable capsules containing 0.050 g. of the active ingredient by the following procedure for 15,000 capsules.

| Ingredients: | Grams |
|---|---|
| 1-benzyl-2-(2-dimethylaminoethyl)-isoindoline dihydrochloride | 750.000 |
| Mannitol | 3002.500 |
| Stearic acid | 103.500 |
| Talcum | 295.000 |

A mixture of all ingredients is passed through a No. 20 screen and mixed in the Hobart machine for 30 minutes. The mix is filled into No. 2 pink capsules on the No. 8 capsule machine with 0.260 g. in each capsule.

Example 44

A solution of 1-benzyl-2-(2-dimethylaminoethyl)-isoindoline dihydrochloride for ampules containing 0.050 g. of the active ingredient may be prepared as follows:

| Ingredients: | Grams |
|---|---|
| 1-benzyl-2-(2-dimethylaminoethyl)-isoindoline dihydrochloride | 11.250 |
| Sodium bisulfite | 0.450 |
| Sodium formate | 18.450 |
| Formic acid | 4.140 |
| Sodium chloride | 18.000 |
| Water for injection (sterile) q.s. | |

The formic acid is dissolved in about 3 liters of sterile water for injection, to which solution is given the sodium formate. In the following order are added to the solution the sodium bisulfide, the 1-benzyl-2-(2-dimethylaminoethyl)-isoindoline dihydrochloride and the sodium chloride. The volume is brought to about 4.500 lt. with water for injection and the solution filtered through a medium porosity sintered glass filter, and then through a sterile millipore filter system. Portions of 20.5 ml. of this filtrate are filled aseptically into sterile 20 ml. amber ampules which have been previously flushed with nitrogen gas, and the ampules are sealed and inspected.

Example 45

The 1-benzyl-2-(2-dimethylaminoethyl)-isoindoline dihydrochloride, described in Example 1, may be used in the form of orally applicable tablets prepared by the following procedure (for 1000 tablets).

| Ingredients: | Grams |
|---|---|
| 1-benzyl-2-(2-dimethylaminoethyl)-isoindoline dihydrochloride | 50.00 |
| Tragacanth BC | 4.00 |
| Lactose U.S.P | 124.00 |
| 3A alcohol 50%, q.s. | |
| Talcum U.S.P | 10.00 |
| Corn starch | 10.00 |
| Stearic acid | 2.00 |

The 1-benzyl-2-(2-dimethylaminoethyl)-isoindoline dihydrochloride, the tragacanth BC and the lactose U.S.P. are triturated together and granulated with sufficient 50% 3A alcohol. The moist mass is passed through a No. 10 mesh screen. The granules are dried thoroughly and broken on a No. 16 mesh screen, then mixed with the talcum U.S.P., the corn starch and the stearic acid. The tablets weighing 200 mg. are manufactured by compression using $10/32''$ diameter punches and dies.

In addition to the methods described above, i.e. conversion of a 2-tertiary aminoalkyl-3-R-phthalimidine to the corresponding isoindoline by reduction or ring closure of a 2-R-carbonyl-benzoic acid N-tertiary aminoalkylamide under reductive conditions, the 1-R-2-tertiary aminoalkyl-isoindolines of this invention, in which R stands for an aryl or an aralkyl group, and in which the aromatic group, as well as the aromatic portion of the isoindoline nucleus may be unsubstituted or may contain as substituents those defined hereinbefore, and the salts and quaternary ammonium compounds thereof, may also be obtained by way of other procedures.

Thus, a 1-R-isoindoline may, for example, be reacted with a reactive ester of a tertiary aminoalkanol, yielding the desired 1-R-2-tertiary aminoalkyl-isoindoline or a salt thereof. An ester of a tertiary aminoalkanol is more especially an ester with a strong acid, such as a hydrohalic acid, e.g. hydrogen chloride, hydrogen bromide or hydrogen iodide; sulfuric acid; or an organic sulfonic acid, e.g. p-toluene sulfonic acid. The tertiary aminoalkanol, used in the form of a reactive ester, is more especially a tertiary amino-lower alkanol, the tertiary aminoalkyl portion of which is identical with the one defined hereinabove. The reaction of the reactive ester of a tertiary aminoalkanol with the 1-R-isoindoline is preferably carried out in the presence of an acid binding agent, such as, for example, an alkali metal carbonate or an alkaline earth metal carbonate, e.g. sodium carbonate, potassium hydrogen carbonate or calcium carbonate; or an alkali metal hydroxide, e.g. sodium or potassium hydroxide; or an organic base, e.g. pyridine, collidine or trimethylbenzyl-ammonium hydroxide. The reaction may be performed in the absence or preferably in the presence of a solvent such as an alkanol, e.g. methanol, ethanol or isopropanol.

The 1-R-isoindolines used as the starting material are known or may be prepared according to methods known for the preparation of isoindolines. Thus, treatment of a 3-R-phthalide with ammonia and subsequent hydrogenation of the 3-R-phthalimidine with a di-light metal hydride, e.g. lithium aluminum hydride, yields the desired 1-R-isoindoline.

A further process for the preparation of the 1-R-2-tertiary aminoalkyl-isoindolines and salts thereof, may consist, for example, in treatment of a [1-R-isoindolinyl-(N)]-alkanoic acid tertiary amide or of a 1-R-isoindolide of a tertiary aminoalkanoic acid, the alkanoic acid of which contains from 2 to 7 carbon atoms, with a reagent capable of converting the carbonyl group of an amide into a methylene group. Reagents suitable for this reaction are especially di-light-metal hydrides, such as lithium aluminum hydride, which may be also used in the presence of a catalyst, such as aluminum chloride. Instead of using the isoindolinyl derivatives mentioned above, the corresponding 3-R-phthalimidine derivatives, i.e. a [3-R-phthalimidinyl-(N)]-alkanoic acid tertiary amide or a 3-R-phthalimidide of a tertiary aminoalkanoic acid, may be used as the starting material in such a reaction and upon treatment with an excess of the reducing agent, e.g. lithium aluminum hydride, may yield without isolation of an intermediarily formed, partly hydrogenated product, the desired 1-R-2-tertiary aminoalkyl-isoindoline. The reduction step is carried out in the presence of a solvent, for example, an ether solvent, e.g. diethylether, tetrahydrofurane or p-dioxane. Also catalytically activated hydrogen, for example, in the presence of a copper barium chromite catalyst, as well as an electrolytic reduction may yield the desired isoindoline derivative.

The amides used as starting materials in the above reaction may be prepared by methods known in themselves for the preparation of amides. Thus, a [1-R-isoindolinyl-(N)]-alkanoic acid halide, e.g. chloride, may yield upon reaction with a secondary amine, such as, the N,N-di-lower hydrocarbonamines or an N,N-lower alkylene-imines outlined hereinbefore, the desired [1-R-isoindolinyl-(N)]-alkanoic acid tertiary amide. On the other hand, a 1-R-isoindoline may be reacted with a tertiary aminoalkanoic acid halide, e.g. chloride, in the presence of an acid binding reagent, e.g. sodium carbonate or potassium hydrogen carbonate, to produce the 1-R-isoindolide of a tertiary amino-alkanoic acid. Instead of using a 1-R-isoindoline derivative the corresponding 3-R-phthalimidine derivative may be used as well; thus the corresponding [3-R-phthalimidinyl-(N)]-alkanoic acid tertiary amide or the 3-R-phthalimide of a tertiary amino-alkanoic acid may be formed.

A third modification of the process consists in treating a 2-(R-methyl)-tertiary aminoalkyl-aminomethyl-benzene, the benzene nucleus of which may be unsubstituted or substituted as described above, and the 2-R-methyl group of which contains a reactively esterified hydroxyl group attached to the methyl group, such as a halogen atom, e.g. chlorine or bromine, in such a way that the desired 1-R-2-tertiary aminoalkyl-isoindoline or a salt thereof is formed. Such a ring closure may be effected by treatment with a strong base such as an alkali metal hydroxide, e.g. sodium or potassium hydroxide. Thus, for example, a 2-(phenyl-halogeno-methyl)-N,N-di-lower alkyl-aminomethyl-aminomethyl-benzene may be treated with sodium hydroxide to form the desired 1-R-2-di-lower alkylamino-lower alkyl-isoindoline.

The starting material used in this modification of the general process may be prepared by treating a 2-R-methyl-tertiary aminoalkyl-aminomethyl-benzene, the R-methyl group of which contains a hydroxyl group attached to methyl, and which may be obtained by reducing a 2-R-carbonyl-N-tertiary aminoalkyl-aminomethyl-benzene with a reducing agent capable of converting a carbonyl group into a carbinol, such as hydrogen in the presence of a catalyst, e.g. platinum oxide, with a reagent capable of converting a hydroxyl group into an esterified hydroxyl group, such as, a halogen, e.g. chlorine or bromine atom. Reagents for this conversion are for example thionylhalides, e.g. thionyl-chloride.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

What is claimed is:

1. A member selected from the group consisting of isoindoline compounds of the formula:

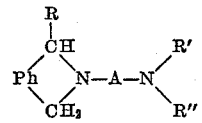

in which R represents a member selected from the group consisting of phenyl, phenyl-lower alkyl, (lower alkyl-phenyl)-lower alkyl, (halogeno-phenyl)-lower alkyl, (hydroxy-phenyl)-lower alkyl, (lower alkoxy-phenyl)-lower alkyl, (methylenedioxy-phenyl)-lower alkyl, (amino-phenyl)-lower alkyl, (dimethylamino-naphthyl)-lower alkyl, naphthyl-lower alkyl, (lower alkyl-naphthyl)-lower alkyl, (halogeno-naphthyl)-lower alkyl, (hydroxy-naphthyl)-lower alkyl, (lower alkoxy-naphthyl)- lower alkyl, (methylenedioxy-naphthyl)-lower alkyl, (amino-naphthyl)-lower alkyl, and (dimethylamino-naphthyl)-lower alkyl, A stands for lower alkylene of 1 to 3 carbon atoms, R' and R" each represents a member selected from the group consisting of lower alkyl, lower alkenyl, cyclopentyl, cyclohexyl, phenyl, benzyl and, when taken together, the bonds necessary to form a member selected from the group consisting of pyrrolidino, 2-methyl-pyrrolidino, piperidino, 2-methyl-piperidino, 3-methyl-piperidino, 4-methyl-piperidino, 3-hydroxy-piperidino, 3-acetoxy-piperidino, 3-hydroxymethyl-piperidino, hexamethyleneimino, morpholino, thia-morpholino, piperazino, 4-methyl-piperazino, 4-hydroxyethyl-piperazino and 4-acetoxyethyl-piperazino, and Ph stands for a member selected from the group consisting of o-phenylene, halogeno-o-phenylene, hydroxy-o-phenylene, lower alkoxy-o-phenylene, lower alkyl-o-phenylene, amino-o-phenylene and dimethylamino-o-phenylene, the therapeutically useful acid addition salts and the lower alkyl quaternary ammonium compounds thereof.

2. 1-R-2-(N,N-di-lower alkyl-amino-lower alkyl)-isoindoline, in which R stands for benzyl.

3. 1-benzyl-2-(2-dimethylaminoethyl)-isoindoline.

4. The l-antipode of 1-benzyl-2-(2-dimethylaminoethyl)-isoindoline.

5. The d-antipode of 1-benzyl-2-(2-dimethylaminoethyl)-isoindoline.

6. 1 - (3 - methyl - benzyl) - 2 - (2 - dimethylaminoethyl)-isoindoline.

7. 1 - benzyl - 2 - (2 - dimethylaminoethyl) - isoindoline, which contains a chlorine in one of the positions 5 and 6.

8. 1 - (3 - phenylpropyl) - 2 - (2 - dimethylaminoethyl)-isoindoline.

9. 1 - benzyl - 2 - (3 - dimethylaminopropyl) - isoindoline methiodide.

10. 1 - [naphthyl - (1) - methyl] - 2 - (2 - dimethylaminoethyl)-isoindoline.

11. 1 - [naphthyl - (2) - methyl] - 2 - (2 - -dimethylaminoethyl)-isoindoline.

12. 1 - benzyl - 2 - (2 - dimethylaminoethyl) - isoindoline methiodide, which contains a chlorine atom in one of the positions 5 and 6.

References Cited in the file of this patent

UNITED STATES PATENTS

| 2,528,940 | Wright | Nov. 7, 1950 |
| 2,846,382 | Allen | Aug. 5, 1958 |

FOREIGN PATENTS

| 1,108,117 | France | Oct. 24, 1955 |

UNITED STATES PATENT OFFICE
CERTIFICATE OF CORRECTION

Patent No. 3,031,458                                          April 24, 1962

Charles Ferdinand Huebner

It is hereby certified that error appears in the above numbered patent requiring correction and that the said Letters Patent should read as corrected below.

Column 1, line 72, for "3-hypdroxymethyl-" read -- 3-hydroxymethyl- --; column 2, line 25, for "salicyclic" read -- salicylic --; line 35, for "mono," read -- mono-, --; column 4, line 27, after "brought" insert -- about --; column 15, line 40, for "6-chloro-" read -- 6)-chloro- --; column 16, line 55, for "2-(2-dimethylaminoethyl-3-" read -- 2-(2-dimethylaminoethyl)-3- --; column 17, line 8, for "-2-(2-dimethylaminoethyl-" read -- -2-(2-dimethylaminoethyl)- --.

Signed and sealed this 31st day of March 1964.

(SEAL)
Attest:
ERNEST W. SWIDER

Attesting Officer

EDWARD J. BRENNER

Commissioner of Patents